(12) United States Patent
Ball

(10) Patent No.: US 7,013,756 B2
(45) Date of Patent: Mar. 21, 2006

(54) TRANSMISSION WITH DEEP REDUCTION LOW RANGE SPLITTER GEAR

(75) Inventor: Landon Ball, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 28 days.

(21) Appl. No.: 10/788,626

(22) Filed: Feb. 27, 2004

(65) Prior Publication Data

US 2005/0188786 A1    Sep. 1, 2005

(51) Int. Cl.
    *F16H 3/02*      (2006.01)

(52) U.S. Cl. ...................................................... 74/745

(58) Field of Classification Search .................. 74/335, 74/745
See application file for complete search history.

(56) References Cited

U.S. PATENT DOCUMENTS

| | | | |
|---|---|---|---|
| 4,754,665 A * | 7/1988 | Vandervoort | 74/745 |
| 4,876,924 A | 10/1989 | Fletcher et al. | |
| 5,062,313 A * | 11/1991 | Fletcher | 74/335 |
| 5,390,563 A | 2/1995 | Reynolds | |
| 5,421,222 A * | 6/1995 | Stine et al. | 74/745 |
| 5,679,096 A * | 10/1997 | Stine et al. | 477/111 |
| 6,049,751 A | 4/2000 | Palmeri | |
| 6,085,606 A * | 7/2000 | Stine et al. | 74/331 |

\* cited by examiner

*Primary Examiner*—Dirk Wright
(74) *Attorney, Agent, or Firm*—Carlson, Gaskey & Olds

(57) ABSTRACT

A low speed splitter transmission assembly includes a main gearbox and an auxiliary gearbox. The transmission assembly provides a relatively small numerical gear ratio step from the highest numerical gear ratio to the second highest gear ratio. The relatively small step between the highest and the second highest numerical gear ratios allows shifting from the highest numerical gear ratio during movement of the vehicle.

17 Claims, 6 Drawing Sheets

ROAD SPEED

| GEAR | | RATIO | SPLIT |
|---|---|---|---|
| 1 | LOW LOW | 14.54 | |
| 2 | 1ST | 12.72 | 0.14 |
| 3 | 2ND | 9.23 | 0.38 |
| 4 | 3RD | 6.75 | 0.37 |
| 5 | 4TH | 4.92 | 0.37 |
| 6 | 5TH | 3.57 | 0.38 |
| 7 | 6TH | 2.59 | 0.38 |
| 8 | 7TH | 1.88 | 0.38 |
| 9 | 8TH | 1.37 | 0.37 |
| 10 | 9TH | 1.00 | 0.37 |
| 11 | 10TH | 0.73 | 0.38 |
| REV LOW | REV LOW | 16.17 | |
| REV HIGH | REV HIGH | 2.88 | |
| REV SPLIT | REV SPLIT | 14.15 | |
| OVERALL FWD | | 20.04 | |

Fig-3

| PLANE | GEAR | NO. OF TEETH |
|---|---|---|
| HEAD SET | 18 | 54 |
| | 20 | 55 |
| B | 56 | 52 |
| | 58 | 73 |
| C | 60 | 62 |
| | 62 | 46 |
| D | 64 | 70 |
| | 66 | 38 |
| E | 68 | 66 |
| | 70 | 26 |
| REV | 72 | 48 |
| | 74 | 17 |
| F | 76 | 57 |
| | 78 | 42 |
| G | 80 | 16 |
| | 82 | 58 |
| H | 84 | 58 |
| | 86 | 14 |

Fig-4

TRANSMISSION WITH DEEP REDUCTION LOW RANGE SPLITTER GEAR

BACKGROUND OF THE INVENTION

This invention relates to a low range splitter transmission, and specifically to a low range splitter transmission capable of shifting while the vehicle is in motion from a highest numerical gear ratio to a second highest numerical gear ratio.

Typically, a range splitter transmission for a heavy truck includes a main gearbox and an auxiliary gearbox. The auxiliary gearbox includes a plurality of selectable gears for expanding the number of available gear combinations. The main gearbox includes a plurality of gears selectable in combination with gears within the auxiliary gearbox.

Many configuration and variations of range splitter transmissions are available to provide an expanded selection of gear ratios. A known range splitter transmission utilizes the gears within the auxiliary gearbox to subdivide gear ratios available within the main gearbox. Another known type of range splitter transmission utilizes the gears with in the auxiliary gearbox in combination with those within the main gearbox to provide low speed high torque. Typically, low speed and high torque are required in heavy off road vehicles, such as construction and mining vehicles.

In some heavy vehicle applications, the highest numerical gear ratio available is much higher than the second highest numerical gear ratio. The highest numerical gear ratio is often referred to as Low Low or Low Split, and the second highest numerical gear ratio referred to as First gear or Low. The large numerical gear ratio step between the Low Low gear and First gear often is so extreme that the vehicle must be completely stopped in order to upshift from Low Low to First gear. As appreciated, in many instances it is not desirable or feasible to stop the vehicle to make the required gear change.

Currently available low range splitter transmission designs are based on a main gearbox that includes a single main gearbox gear used in concert with auxiliary gearbox gears. The highest numerical gear ratio within the main gearbox gear is typically used in combination with gears in the auxiliary gearbox for Low Low and First gears. Typically, the overall range between the highest and lowest numerical gear ratios provided by the transmission is fixed. The difference in ratios between the highest numerical gear ratio (lowest vehicle speed) and lowest numerical gear ratio (highest vehicle speed) must span a desired range in order to provide desired speeds for a specific application.

In order to cover the entire gear ratio range, a step or change in numerical gear ratio between each gear combination is determined and corresponding numerical gear ratios for each specific gear are selected. The span between the highest gear ratio and the lowest gear ratio results in wider or uneven ratio steps between gears. In order to obtain acceptable ratio increases between the most used gears, the gear ratio steps between the highest numerical gear ratio and the second highest numerical gear ratio is greater than would allow realistic shifting during movement of the vehicle.

Accordingly, it is desirable to design a range splitter transmission that spans a desired range of gear ratios while still providing gear ratio steps between speeds that allow shifting to occur while the vehicle is in motion.

SUMMARY OF INVENTION

The present invention provides a low range splitter transmission assembly including a main gearbox and an auxiliary gearbox. The main gearbox includes a single gear plane operating in combination with all gear planes within the auxiliary gearbox to allow numerical gear ratio steps which allow shifting during movement of a vehicle between the highest numerical gear ratio and the second highest numerical gear ratio.

The main gearbox includes an input shaft having a headgear. The headgear drives a countershaft headgear fixed to a counter shaft. The counter shaft includes a plurality of countershaft gears fixed to rotate with the countershaft. A main shaft disposed along a common axis with the input shaft supports a plurality of main shaft gears. Each combination of counter shaft gear and main shaft gear provides a desired numerical gear ratio. Each combination of counter shaft gear and main shaft gear defines an individual gear plane.

Conventionally configured splitter type transmissions utilize the gear plane with the highest numerical gear ratio within the main gear box with only select gear planes within the auxiliary gear box because the gear ratios provided are typically incompatible for any other gear combinations. Such incompatibility is a product of the desired range of gear ratios between the lowest and highest gear ratios along with the number of desired steps between the highest and lowest gear ratios. To provide the desired highest numerical gear ratio (lowest vehicle speed) with the desired lowest numerical gear ratio (Highest vehicle speed), each numerical gear ratio step must be either equal large steps or unequal steps. Typically, the use of unequal steps results in significantly large gear ratio differences between the highest numerical gear ratio and the second highest numerical gear ratio. The significant difference between the highest numerical gear ratio and the second highest numerical gear ratio requires that the vehicle be stopped in order to make the upshift from the highest gear ratio. The splitter transmission of this invention allows for upshifting from the highest numerical gear ratio (Lowest speed) during movement by reducing the difference between highest numerical gear ratio and the second highest numerical gear ratio.

The transmission assembly of this invention utilizes a fifth gear plane within the main gearbox with all gear planes within the auxiliary gearbox. The fifth gear plane is combined with gear planes within the auxiliary gearbox to provide the first and second highest numerical gear ratios and the seventh highest numerical gear ratio. The other speeds available result from combining the other gear planes within the main gearbox with the gear planes within the auxiliary gearbox.

The transmission assembly of this invention provides gear ratio steps having a percent difference between all gears of no more than 40%. Further, the percent difference between the highest numerical gear ratio and the second highest numerical gear ratio is no more than 30%. The relatively small step between the highest and the second highest numerical gear ratios allows shifting during movement of the vehicle. The transmission assembly of the present invention provides an overall gear ratio coverage of at least 19:1.

Accordingly, the splitter transmission of this invention provides a desired range of gear ratios while still providing gear ratio steps between speeds that allow shifting during movement of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a table listing gear ratios for a specific embodiment of this invention; and FIG. 4 is a gear chart illustrating specific numbers of gear teeth disposed within an embodiment of a compound transmission designed according to this invention.

DETAILED DESCRIPTION OF THE PREFERRED EMBODIMENT

Figure 1:
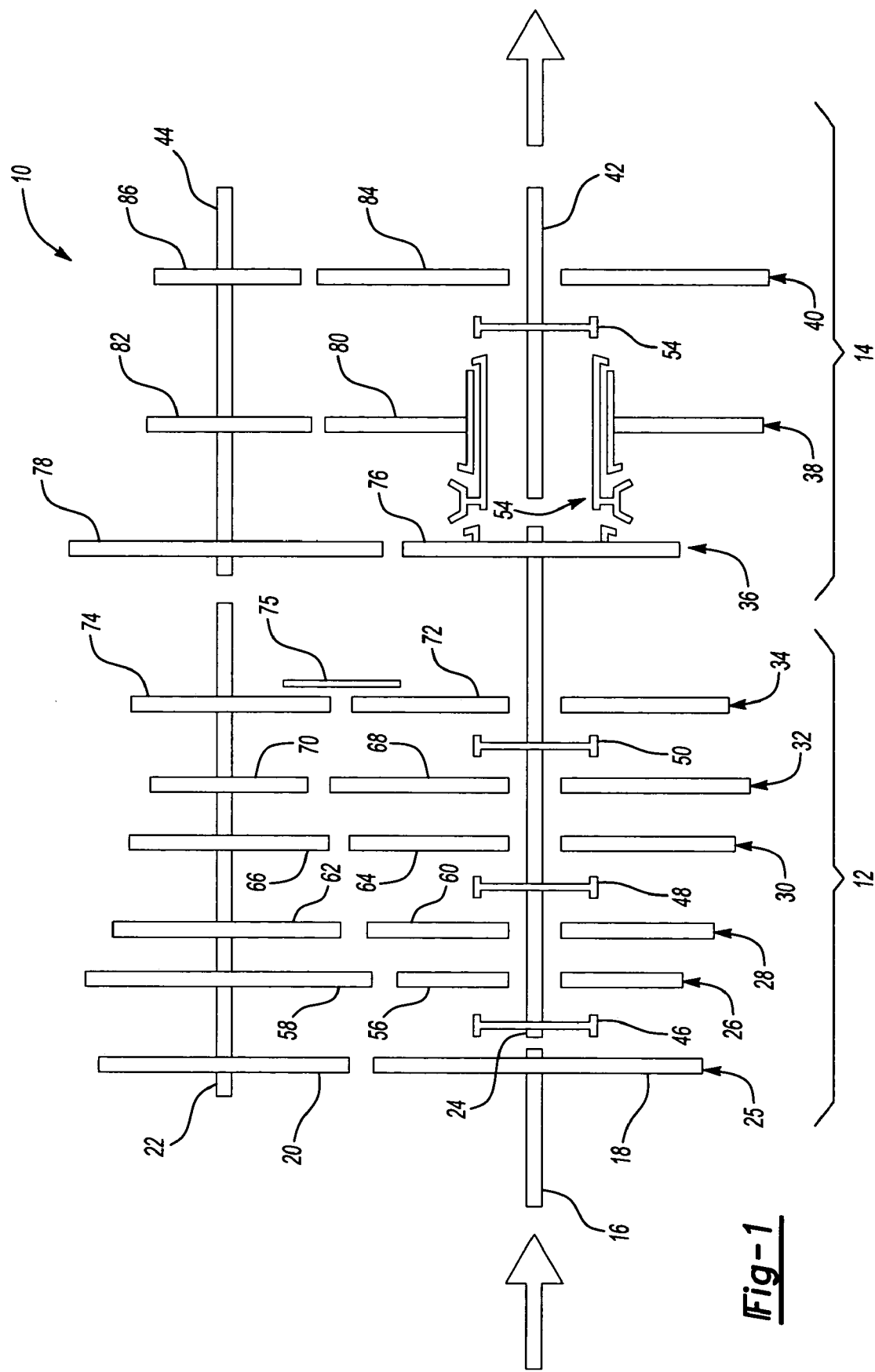
FIG. 1 is a schematic illustration of a low range splitter transmission.

FIG. 1 schematically illustrates a low speed splitter transmission assembly 10 having a main gearbox 12 and an auxiliary gearbox 14. The splitter transmission 10 includes a single gear plane within the main gearbox 12 that operates in combination with all gear planes within the auxiliary gearbox 14 such that each increase in gear ratio between each speed is sufficiently small to allow shifting during movement of the vehicle.

The transmission assembly 10 of this invention includes a difference between the highest gear ratio and the second highest gear ratio provided by combining gear planes within the main gearbox 12 and the auxiliary gearbox 14 that is at most 40%, and preferably less than 40%. The relatively small gear ratio steps allow shifting during movement of the vehicle between the highest numerical gear ratio and the second highest numerical gear ratio.

The term "speed" as used herein refers to a selected gear position such as Low Low, First, Second, Third, Etc. The term numerical gear ratio is used herein to refer to the overall ratio obtained by all gear combinations between an input and an output of the transmission assembly 10. The term "gear plane" as used herein refers to a specific combination of counter shaft gear and main shaft gear. The terminology as defined is not considered to be limiting, as it is only a convention that describes operation of the novel aspects of the transmission assembly 10.

The main gearbox 12 includes an input shaft 16 having a headgear 18. The headgear 18 drives countershaft headgear 20 fixed to counter shaft 22. The counter shaft 22 includes a plurality of countershaft gears 20,58,62,66,70, 74 fixed to rotate with the countershaft 22. A main shaft 24 disposed along a common axis with the input shaft 16 supports a plurality of main shaft gears 56,60,64,68,72, driven by the countershaft gears 20,58,62,66,70, 74. The main shaft gears 56,60,64,68,72 are not rotationally fixed to the main shaft 24. Each of the main shaft gears 56,60,64,68,72 rotates freely relative to the main shaft 24. The main shaft 24 is rotated upon selective engagement of one of several clutch collars 46,48, and 50 engagable with one of the main shaft gears 56,60,64,68,72. Each of the gears 20,58,62,66,70, 74 on the counter shaft 22 continuously engages and drives the main shaft gears 56,60,64,68,72.

Each combination of counter shaft gear and main shaft gear provides a desired gear ratio. Each combination of counter shaft gear and main shaft gear is indicated as an individual gear plane. The main gearbox includes six gear planes 25, 26, 28, 30, 32, and 34. The reverse gear plane 34 includes an idler gear 75 to reverse direction of the main shaft 24 relative to the input shaft 16. The first gear plane 25 includes the headgear 18 that engages the clutch collar 46 to couple the input shaft 16 to the main shaft 24. The remaining gear planes are engaged in combination with gear planes 36, 38, and 40 within the auxiliary gear box 14. The gear plane 36 is a coupling of the main shaft 24 to the output shaft 42.

The auxiliary gear box 14 includes a second counter shaft 44 driven by gear 76. The gear 76 is fixed to the main shaft 24 to drive the counter shaft gear 78. The second counter shaft 44 includes gears 82 and 86 that are engaged to drive gears 80 and 84 supported on an output shaft 42. The gears 80 and 84 rotate about the output shaft 42 and are selectively coupled by clutch collar 54 and/or slip collar 52 to drive the output shaft 42. Gear plane 40 is only operable with gear planes 32 and 34 to provide the highest forward and reverse numerical gear ratios. The fifth gear plane 32 combines with gear planes within the auxiliary gearbox 14 to provide the highest, second highest and seventh highest numerical gear ratios.

Conventionally configured splitter type transmissions utilize the gear plane with the highest gear ratio within the main gear box with only select gear planes within the auxiliary gear box because the gear ratios provided are typically incompatible for any other gear combinations. Such incompatibility is a product of the desired range between the lowest and highest gear ratios, and the number of desired steps therebetween. In order to provide the desired highest numerical gear ratio with the desired lowest numerical gear ratio, the steps between must equal large steps or a combination of unequal steps. Typically, the use of unequal steps results in significantly large numerical gear ratio differences between the highest numerical gear ratio and the second highest numerical gear ratios. This placement allows smaller numerical gear ratio steps between commonly used speeds. The significant difference between the highest numerical gear ratio and the second highest numerical gear ratio often requires that the vehicle be stopped in order to make the upshift from the highest numerical gear ratio (lowest speed). The splitter transmission of this invention allows for upshifting from the highest numerical gear ratio during movement by limiting the difference between numerical gear ratios.

Figure 2A:
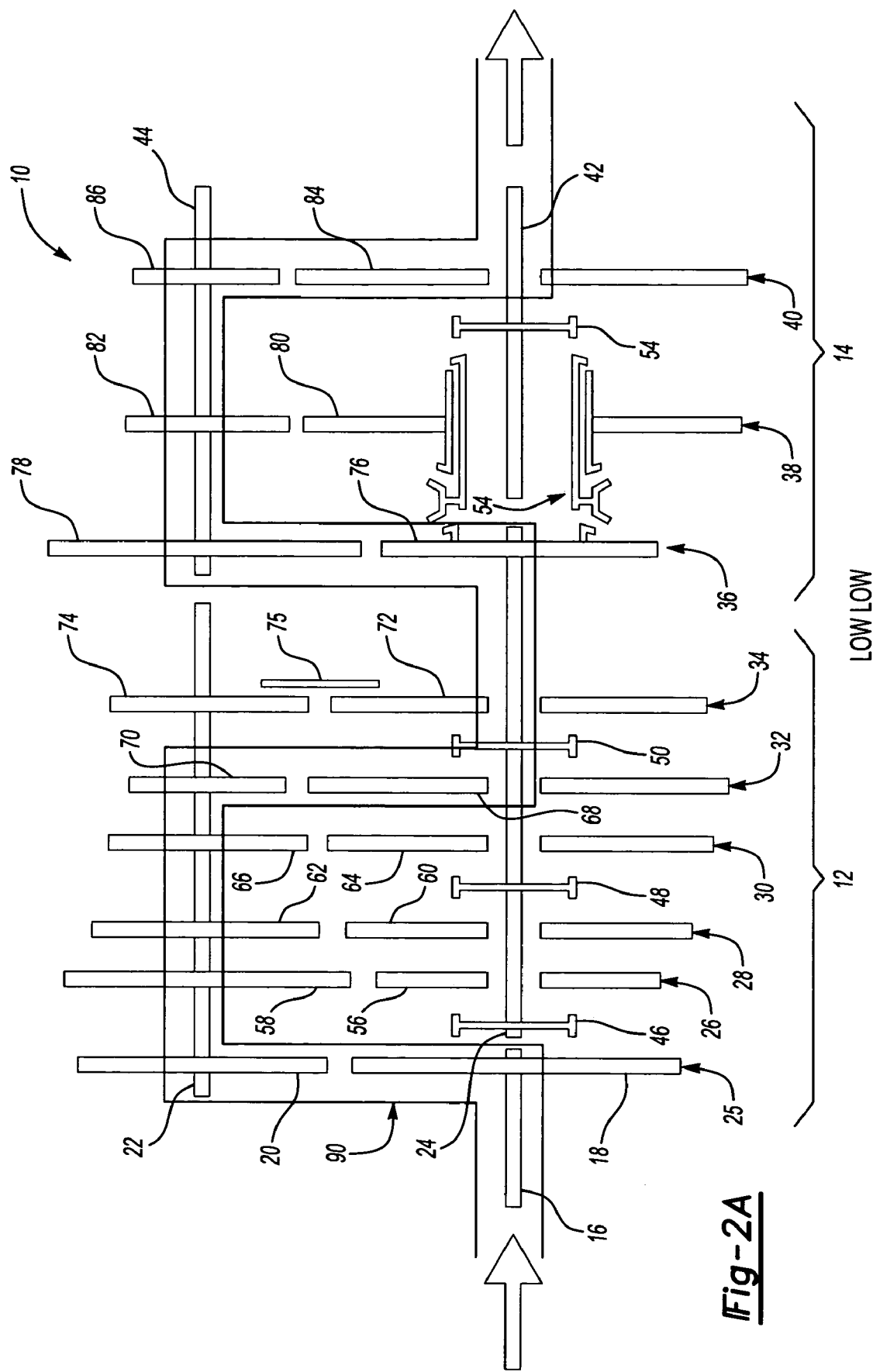
FIGS. 2A–2C are schematic illustrations of power flow through the low range splitter transmission at different gear ratios.
Figure 2B:
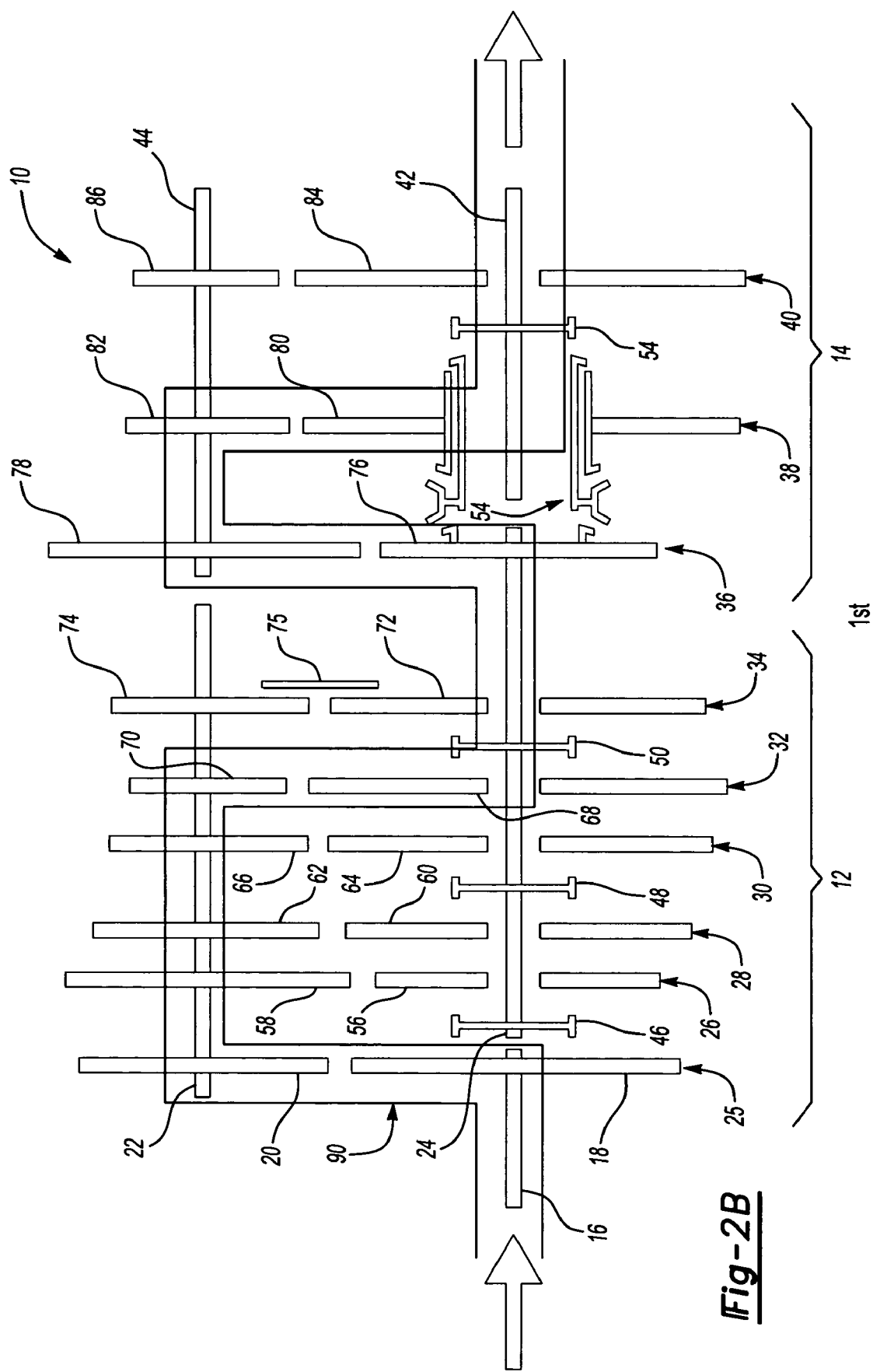
Figure 2C:
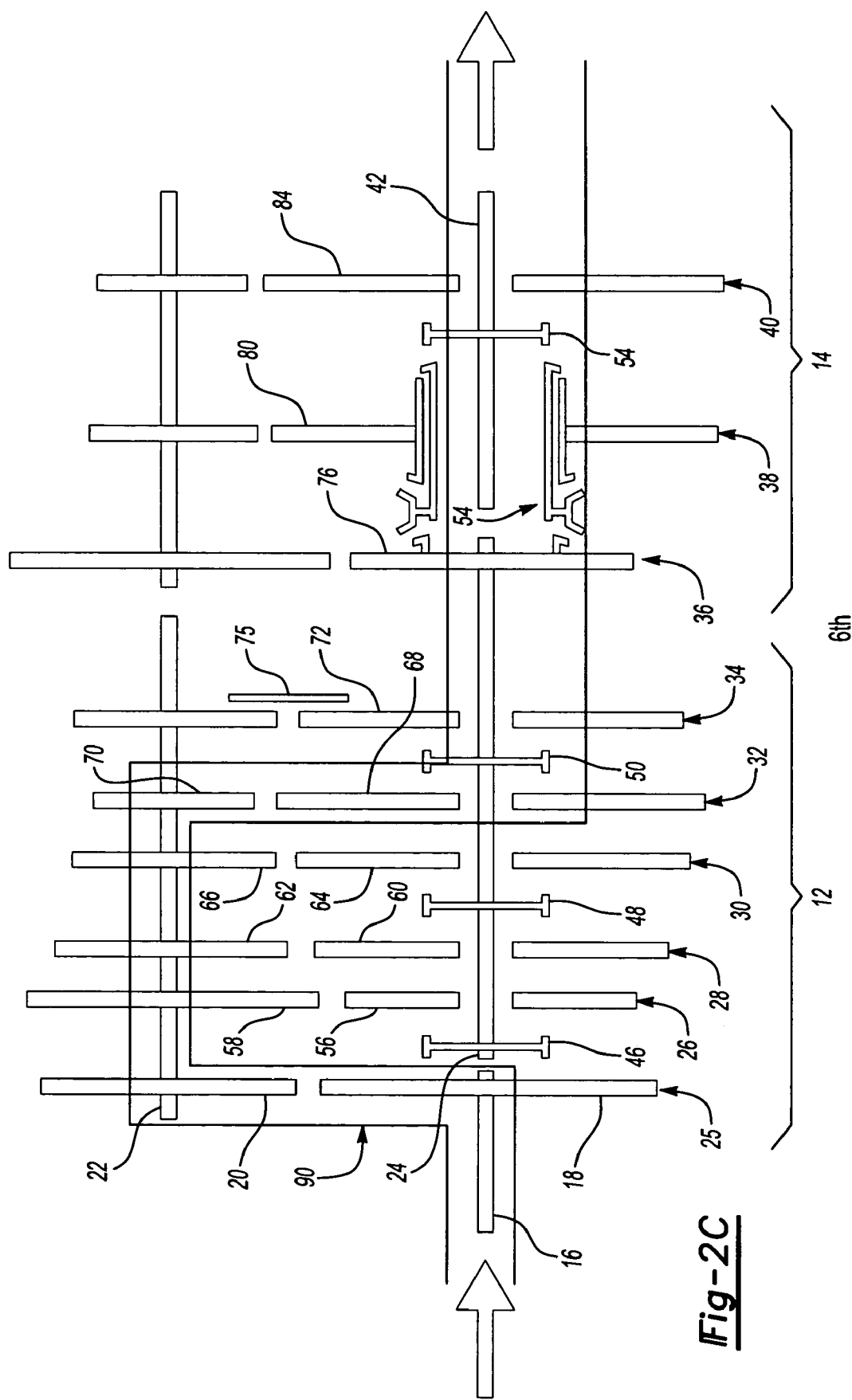

Referring to FIGS. 2A–C, the fifth gear plane 32 within the main gear box includes a gear ratio usable with all three gear planes 36, 38 and 40 within the auxiliary gear box 14. FIGS. 2A–C schematically illustrates power flow through the transmission assembly 10. The gear plane 32 is combined with the gear plane 40 within the auxiliary gear box 14 to provide the highest numerical gear ratio. First gear is the next highest gear ratio and is provide by combining the gear plane 32 with gear plane 38 (FIG. 2B). In conventional transmissions, gear plane 32 is only used for the highest and second highest numerical gear ratios therefore requiring the remaining gear planes to combine to provide the remaining gear ratio combinations.

The transmission assembly 10 illustrated includes 11 forward speeds, and 3 reverse speeds. Second, third, fourth and fifth speeds are provide by combining gear planes 30, 28,26, and 25 with the gear plane 38 within the auxiliary gear box 14. A sixth speed is provided by combining the gear plane 32 with gear plane 36 (FIG. 2C). As appreciated, the gear plane 36 is a coupling of the main shaft 24 to the output shaft 42. The remaining speeds, seventh, eighth, ninth and tenth are provided by combining gear planes 30, 28, 26 and 25 with the main shaft 24 coupled directly to the output shaft 42. The use of the gear plane 32 with the gear plane 36 results from selection of gear ratios for each gear plane.

Referring to FIG. 3, each speed of the transmission assembly 10 provides a gear ratio having a difference from the next lowest or highest speed of no more than 40%. The transmission assembly illustrated includes gears combining to provide overall gear ratio coverage of at least 19:1 and preferably as high as a 25:1 ratio. The percent difference between each gear is shown and includes a change between the highest overall gear ratio and the second highest gear ratio that is no more than 40% and is preferably less than 30%.

FIG. 4 is a chart listing an example of numerical gear teeth for each gear within each gear plane. The gear specifications listed in the chart of FIG. 4 is only one embodiment that provides the desired gear ratios and percent differences between each speed. This is only one possible embodiment of specific gear combinations. A worker skilled in the art would understand that other gear combinations are within the contemplation of this invention.

The low speed splitter transmission assembly 10 of this invention provides gear ratio difference between each speed of less than 40%, and between the highest numerical gear ratio (lowest speed) and second highest numerical gear ratio of less than 14%. The small differences between gear ratios provides for upshifting from the highest numerical gear ratio (lowest speed) to the second highest numerical gear ratio (second lowest speed) during movement of the vehicle.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A multi-speed transmission assembly for a vehicle comprising:
   a plurality of selectable speeds within a main gear box, the main gearbox having a highest numerical gear ratio; and
   at least three selectable speeds within an auxiliary gearbox, and each of the at least three selectable speeds within the auxiliary gearbox being selectively engaged in conjunction with the highest numerical gear ratio within the main gearbox during forward movement of the vehicle.

2. The assembly of claim 1, wherein the highest numerical gear ratio within the main gear box cooperates with the at least three selectable gears within the auxiliary gear box to provide a combined overall highest numerical gear ratio, a combined overall second highest numerical gear ratio, and a combined overall seventh highest numerical gear ratio of the transmission assembly.

3. The assembly of claim 1, wherein the plurality of selectable speeds within the main gear box are combinable with the at least three selectable speeds within the auxiliary gearbox to provide a plurality of overall selectable speeds, and a difference in gear ratios between each of the plurality of overall selectable speeds is less than 40 percent.

4. The assembly of claim 1, wherein a ratio between highest overall forward gear ratio of the transmission assembly and a lowest overall forward gear ratio of the transmission assembly is greater than or equal to 19 to 1.

5. The assembly of claim 1, wherein a percent difference between an overall highest numerical gear ratio and an overall second highest numerical gear ratio is less than 30%.

6. The assembly of claim 1, wherein the main gearbox includes five gears supported for rotation about a main shaft.

7. The assembly of claim 1, wherein the main gear box includes an input shaft and a main shaft, the main shaft supporting a plurality of gears, and the plurality of gears selectively coupled to the main shaft for selecting a gear ratio.

8. The assembly of claim 7, including at least one countershaft driven by an input gear fixed to the input shaft.

9. The assembly of claim 1, wherein the auxiliary gearbox includes at least two gears supported about an output shaft that are selectively coupled to the output shaft by corresponding clutch collars.

10. A low range splitter transmission assembly comprising;
    a plurality of main gears supported about a main shaft, said main gears selectively coupled to said main shaft to provide a plurality of different main gear ratios, said plurality of main gear ratios including a highest numerical gear ratio; and
    at least two auxiliary gears supported about an output shaft, said at least two auxiliary gears selectively coupled to said output shaft to provide different split gear ratios, wherein each of said at least two auxiliary gears are selectively engageable during rotation of the output shaft with said plurality of main gears providing said highest numerical gear ratio.

11. The assembly of claim 10, wherein there are three of said auxiliary gears, and said highest numerical gear ratio of the plurality of main gears when engaged in combination with said three auxiliary gears provides an overall highest numerical gear ratio, a second overall highest numerical gear ratio, and a seventh overall highest numerical gear ratio of the transmission assembly.

12. The assembly of claim 11, wherein an overall difference between said overall highest numerical gear ratio and an overall lowest numerical gear ratio is between 19:1 and 25:1.

13. The assembly of claim 10, wherein a percent difference between the overall highest numerical gear ratio and the second overall highest numerical gear ratio allows shifting during rotation of said output shaft.

14. The assembly of claim 13, wherein said percent difference between the highest overall numerical gear ratio and the second overall highest numerical gear ratio is less than 30%.

15. A low range splitter transmission assembly for a vehicle comprising;
    a main section including a plurality of main gears supported about a main shaft, said main gears selectively coupled to said main shaft to provide a plurality of main gear ratios, said plurality of main gear ratios including a highest numerical gear ratio; and
    an auxiliary section including at least two auxiliary gears supported about an output shaft, said at least two auxiliary gears selectively coupled to said output shaft to provide different auxiliary gear ratios, wherein all of said gear ratios are selectively controllable for engagement in combination with said highest numerical gear ratio to provide an overall numerical gear ratio, and each of said plurality of main gears are selectively engageable with both of said at least two auxiliary gears during movement of the vehicle.

16. The assembly as recited in claim 15, wherein said plurality of main gears within the main section are combinable with said at least two auxiliary gears within the auxiliary section to provide an overall highest numerical gear ratio.

17. The assembly as recited in claim 15, wherein said plurality of main gears includes five gears, and said at least two auxiliary gears includes three gears.

* * * * *